US009066207B2

(12) United States Patent
Marti et al.

(10) Patent No.: US 9,066,207 B2
(45) Date of Patent: Jun. 23, 2015

(54) MANAGING STATES OF LOCATION DETERMINATION

(71) Applicant: Apple Inc., Cupertino, CA (US)

(72) Inventors: Lukas M. Marti, Santa Clara, CA (US); Robert Mayor, Half Moon Bay, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 13/715,710

(22) Filed: Dec. 14, 2012

(65) Prior Publication Data

US 2014/0171068 A1  Jun. 19, 2014

(51) Int. Cl.
*H04W 24/00* (2009.01)
*H04W 4/02* (2009.01)
*G01S 1/04* (2006.01)
*G01S 1/06* (2006.01)
*G01S 5/02* (2010.01)
*H04W 64/00* (2009.01)

(52) U.S. Cl.
CPC .............. *H04W 4/025* (2013.01); *G01S 1/047* (2013.01); *G01S 1/06* (2013.01); *G01S 5/0252* (2013.01); *G01S 5/0278* (2013.01); *H04W 64/00* (2013.01)

(58) Field of Classification Search
CPC ......... G01S 19/48; G01S 19/46; G01S 19/05; G01S 1/725; G01S 5/0027; G01S 5/0252; G01S 5/0257; G01S 5/0263; H04W 64/00; H04W 4/025; H04W 4/026; H04W 4/027; H04W 4/043; H04M 1/72572; H04M 2250/12; G01C 21/206; G01C 21/30; G01C 21/32; G01C 21/3667; G06F 17/30241

USPC ............................................... 455/456.1–457
See application file for complete search history.

(56) References Cited

U.S. PATENT DOCUMENTS

| | | | |
|---|---|---|---|
| 6,459,989 B1 * | 10/2002 | Kirkpatrick et al. | 701/470 |
| 8,190,172 B2 | 5/2012 | Shen et al. | |
| 8,285,344 B2 * | 10/2012 | Kahn et al. | 455/570 |
| 8,320,932 B2 * | 11/2012 | Pinder et al. | 455/456.1 |
| 2005/0176441 A1 * | 8/2005 | Jurecka | 455/456.1 |
| 2008/0025477 A1 * | 1/2008 | Farhan | 379/38 |
| 2009/0023461 A1 * | 1/2009 | Filizola et al. | 455/456.3 |
| 2009/0047979 A1 * | 2/2009 | Oh et al. | 455/457 |

(Continued)

FOREIGN PATENT DOCUMENTS

GB  2 451 616 A  2/2009

OTHER PUBLICATIONS

International Search Report and Written Opinion of the International Searching Authority, PCT Application Serial No. PCT/US2014/071745, May 12, 2014, 10 pp.

*Primary Examiner* — Matthew Sams
(74) *Attorney, Agent, or Firm* — Fish & Richardson P.C.

(57) ABSTRACT

A mobile device can be in multiple states of location determination. In each state, the mobile device can use a distinct subsystem to determine a location. A state machine of the mobile device can manage the states, including determining which state the mobile device is in and whether a transition between the states has occurred. A transition can be triggered by a sensor of the mobile device and confirmed by another sensor of the mobile device. When the state machine detects a transition, the mobile device can switch location determination from one subsystem to another subsystem, and change a map user interface to one that is best suited for the new subsystem.

54 Claims, 9 Drawing Sheets

(56) References Cited

U.S. PATENT DOCUMENTS

| | | | |
|---|---|---|---|
| 2009/0196267 A1* | 8/2009 | Walker, Sr. | 370/338 |
| 2010/0317366 A1* | 12/2010 | Shen et al. | 455/456.1 |
| 2012/0015665 A1* | 1/2012 | Farley et al. | 455/456.1 |
| 2012/0052872 A1 | 3/2012 | Do | |
| 2012/0150434 A1 | 6/2012 | Cho et al. | |
| 2012/0169535 A1 | 7/2012 | Kong et al. | |
| 2012/0264446 A1* | 10/2012 | Xie et al. | 455/456.1 |
| 2012/0310529 A1* | 12/2012 | Hamilton et al. | 701/433 |
| 2013/0065604 A1* | 3/2013 | Werner et al. | 455/456.1 |
| 2013/0311080 A1* | 11/2013 | Wirola et al. | 701/409 |

* cited by examiner

MANAGING STATES OF LOCATION DETERMINATION

TECHNICAL FIELD

This disclosure relates generally to location determination.

BACKGROUND

Some mobile devices have features for determining a geographic location. For example, a mobile device can include a receiver for receiving signals from a global satellite system (e.g., global positioning system or GPS). The mobile device can determine a geographic location, including latitude and longitude, using the received GPS signals. In many places, GPS signals can be non-existent, weak, or subject to interference, such that it is not possible to accurately determine a location using the GPS functions of the mobile device. In such cases, the mobile device can determine its location using other technologies. For example, if the location of a wireless access gateway (e.g., a cellular tower) is known, and a mobile device can detect the wireless access gateway, the mobile device can then estimate a current location using a location of the detected wireless access gateway. The mobile device can choose how to determine its location based on whether GPS signals are available. On a mobile device, determining whether the GPS signals are available can take many seconds.

SUMMARY

Methods, program products, and systems for managing states of location determination are described. A mobile device can monitor a state of the mobile device using multiple sensors. When the mobile device determines that the mobile device is in a first state that is suitable for location determination using a first subsystem, the mobile device can determine the location using the first subsystem. Then, when the mobile device determines that, based on readings from a sensor, that the mobile device is likely to be in a second state that is suitable for location determination using a second subsystem, the mobile device can confirm the state transition using readings of another sensor. If the state transition is confirmed, the mobile device can switch location determination from the first subsystem to the second subsystem. Each of the first subsystem and the second subsystem can be a subsystem for determining the location using signals from a global satellite system (e.g., GPS) or a subsystem for determining the location using wireless access gateways.

In general, in one aspect, a mobile device can be in multiple states of location determination. In each state, the mobile device can use a distinct subsystem to determine a location. A state machine of the mobile device can manage the states, including determining which state the mobile device is in, and whether a transition between the states has occurred. A transition can be triggered by events that include a first reading of a sensor of the mobile device indicating a possible transition and a confirmation by another sensor of the mobile device. When the state machine detects a transition, the mobile device can switch location determination from one subsystem to another subsystem, and change a map user interface to one that is best suited for the new subsystem.

The features described in this specification can be implemented to achieve the following advantages. Compared to a conventional mobile device having GPS functions, a mobile device implementing features described in this specification can give a user a smoother experience when the user enters or leaves a building. When a user enters or exits the building, the mobile device can automatically change location determination procedures to avoid or minimize the period of time needed for transition. For example, when the user enters the building in which GPS signals are unavailable, the mobile device can quickly switch the location determination procedure from using GPS signals to using wireless access point signals detectable from inside of the building, instead of performing time-consuming GPS signal searches until time out.

Compared to a conventional mobile device having GPS functions, location determination by a mobile device implementing features described in this specification can be more accurate. The mobile device may be located in a place where GPS signals are unstable, which can lead to location errors if GPS signals are the only bases of location determination. For example, when the mobile device is located in a building near a large window, the mobile device may be able to receive poor signals from some GPS satellites. Based on the poor signals, a conventional mobile device may determine that the device is located tens or hundreds of meters away from the actual location. A mobile device implementing features described in this specification can determine that the device shall use wireless access point signals instead of GPS signals to determine a location, thereby avoiding the error resulted from GPS location determination.

Compared to a conventional mobile device, a mobile device implementing features described in this specification can provide a better user interface for location functions. The device can display a most relevant map to the user. For example, the mobile device can display a building floor plan (e.g., a floor plan of a shopping mall including store names and locations) when the mobile device is in a state indicating that the mobile device is located indoors. The mobile device can automatically switch to displaying a street map when the mobile device moves outdoors (e.g., when the user exits the shopping mall). Accordingly, a mobile device implementing features described in this specification can give a user a map that is more suitable to where the user is located, and therefore provide better user experience when the user uses location functions of the mobile device.

The details of one or more implementations of managing states of location determination are set forth in the accompanying drawings and the description below. Other features, aspects, and advantages of managing states of location determination will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
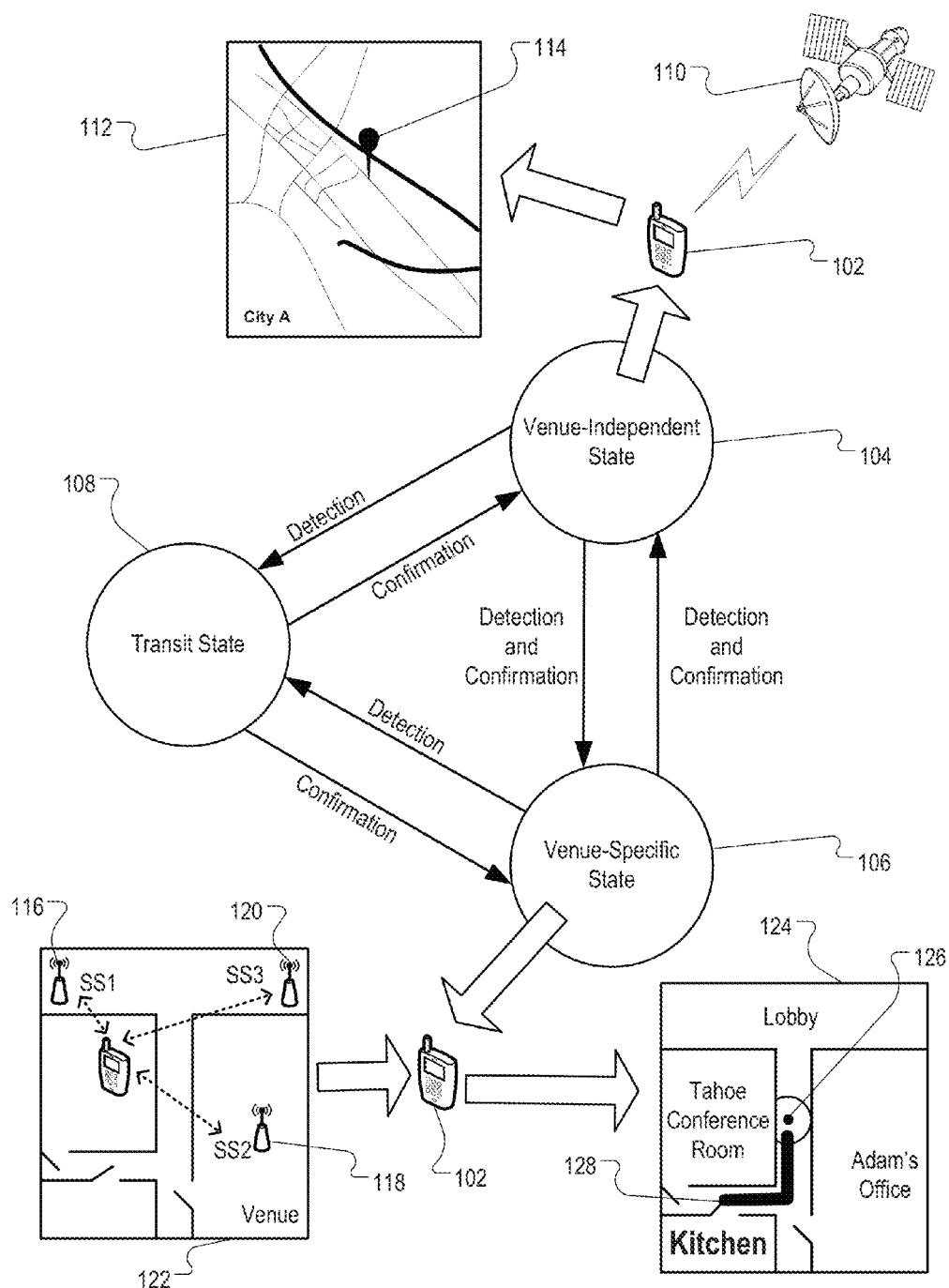
FIG. 1 is a diagram providing an overview of managing states of location determination.

FIG. 1 is a diagram providing an overview of managing states of location determination. Mobile device 102 can be an exemplary device implementing the techniques described in this specification. Mobile device 102 can be in one of multiple states when mobile device 102 determines a location of mobile device 102. These states can include venue-independent state 104, venue-specific state 106, and transit state 108. In each state, mobile device 102 can determine a location of mobile device 102 in a way that is deemed by mobile device 102 as the most suitable way of determining a location in that state. In addition, in each state, mobile device 102 can present the determined location in a user interface unique to the state.

Venue-independent state 104 can be a state in which mobile device 102 is located at a place (e.g., outdoors) where mobile device 102 can receive unobstructed signals from satellites 110. Satellites 110 can be satellites of a global satellite system (e.g., GPS) for providing location determination information. When in venue-independent state 104, mobile device 102 can determine the location ("GPS location") of mobile device 102 based on the signals, and display the GPS location on street map 112. Street map 112 can be a map of streets of an urban, a suburban, or a rural area having a granularity level that is at a street address level or coarser (e.g., at city level, state level, or country level). Street map 112 can be provided by a map server. The GPS location can be represented using exemplary marker 114 in street map 112.

Venue-specific state 106 can indicate that mobile device 102 is located at a venue where GPS signals received by mobile device 102 are obstructed or otherwise interfered with. For example, venue-specific state 106 can correspond to a state in which mobile device 102 is located indoors and cannot receive GPS signals from satellites 110. When in venue-specific state 106, mobile device 102 can determine the location based on signals from one or more signal sources, e.g., signal sources 116, 118, and 120. Signal sources 116, 118, and 120 can be associated with venue 122 in a location fingerprint database. When mobile device is located at venue 122, signals (e.g., radio frequency (RF) signals of signal sources 116, 118, and 120 (e.g., wireless access points) are expected to be detectable by mobile device 102 and usable by mobile device 102 to determine an estimated location ("fingerprint location") of mobile device 102 at venue 122, according to the location fingerprint database.

In venue-specific state 106, mobile device 102 can display the fingerprint location in venue map 124. Venue map 124 can be a map having a finer granularity than a street map 112. Venue map 124 can include representations of features of the venue, for example, representations of walls, offices, conference rooms, or hallways of a building on each of multiple floors. Venue map 124 can be provided by a venue map server (e.g., a server that serves floor plans of buildings). The fingerprint location can be represented by exemplary marker 126 in venue map 124. Marker 126 in venue map 124 can have a different appearance from the appearance of marker 114 in street map 112. In addition, mobile device 102 can provide path 128 for display in venue map 124. Path 128 can represent an indoors path (e.g., along hallways or up or down stairways) traveled by mobile device 102 at venue 122, or a path to a destination at venue 122 as recommended by mobile device 102 based on the fingerprint location.

Mobile device 102 can manage states of location determination, including determining if a transition from venue-independent state 104 to venue-specific state 106 has occurred, or a transition from venue-specific state 106 to venue-independent state 104 has occurred. The transition can occur when one or more conditions are satisfied. The conditions can be based on thresholds on readings from multiple sensors of mobile device 102 and thresholds on probabilities of whether mobile device 102 is located indoors or outdoors. Mobile device 102 can calculate the probabilities based on the sensor readings. Mobile device 102 can determine that a transition has occurred when mobile device 102 receives a series of consecutive detections and confirmation. When a reading of a first sensor reaches a first pre-specified or real-time calculated threshold value, mobile device 102 can determine that a possible transition has been detected. Subsequently, when a reading of a second sensor reaches a second pre-specified or real-time calculated threshold value, mobile device 102 can determine that the possible transition has been confirmed. When a detection has been confirmed, mobile device 102 can determine that a transition has occurred, and then switch the location determination and location display to correspond to the new state into which mobile device 102 has transitioned.

Mobile device 102 can have multiple sensors. For example, mobile device 102 can have a magnetometer, an RF signal detector, a GPS receiver, a gyroscope, a barometer, a hygrometer, a microphone, a light sensor, and an accelerometer. Mobile device 102 can use each of these sensors to detect and to confirm a transition. Mobile device 102 can use a matrix to specify what reading from which sensor can confirm a detection by which other sensor. The detection and confirmation can be based on a probability model where, for example, each of a set of thresholds, if satisfied, can increase or decrease a probability that mobile device is located in a given state.

Mobile device 102 may not always confirm a detection of a possible transition. In addition, sensor readings may conflict with one another. When a detection is not confirmed, or when mobile device 102 detects a conflict, mobile device 102 can transition from venue-independent state 104 or venue-specific state 106 into transit state 108. Transit state 108 can be a state in which mobile device 102 is temporarily uncertain which state mobile device 102 will next transition into. In transit state 108, mobile device 102 can activate each of the multiple sensors and perform statistical analysis on the readings of the sensors to determine the next state. If a detection is confirmed by the statistical analysis, mobile device 102 can transition to a new state; otherwise, mobile device 102 can return to the previous state from which mobile device 102 has reached transit state 108. In various implementations, in transit state 108, mobile device 102 can determine a location of mobile device 102 and display the location according to the previous state or the possible next state. Alternatively, mobile device 102 can temporarily stop location determination using GPS or detected signals to conserve battery, and display a warning to a user upon receiving a location inquiry from the user. The warning can indicate that location determination is still in progress.

Venue-Specific State and Venue-Independent State

Figure 2:
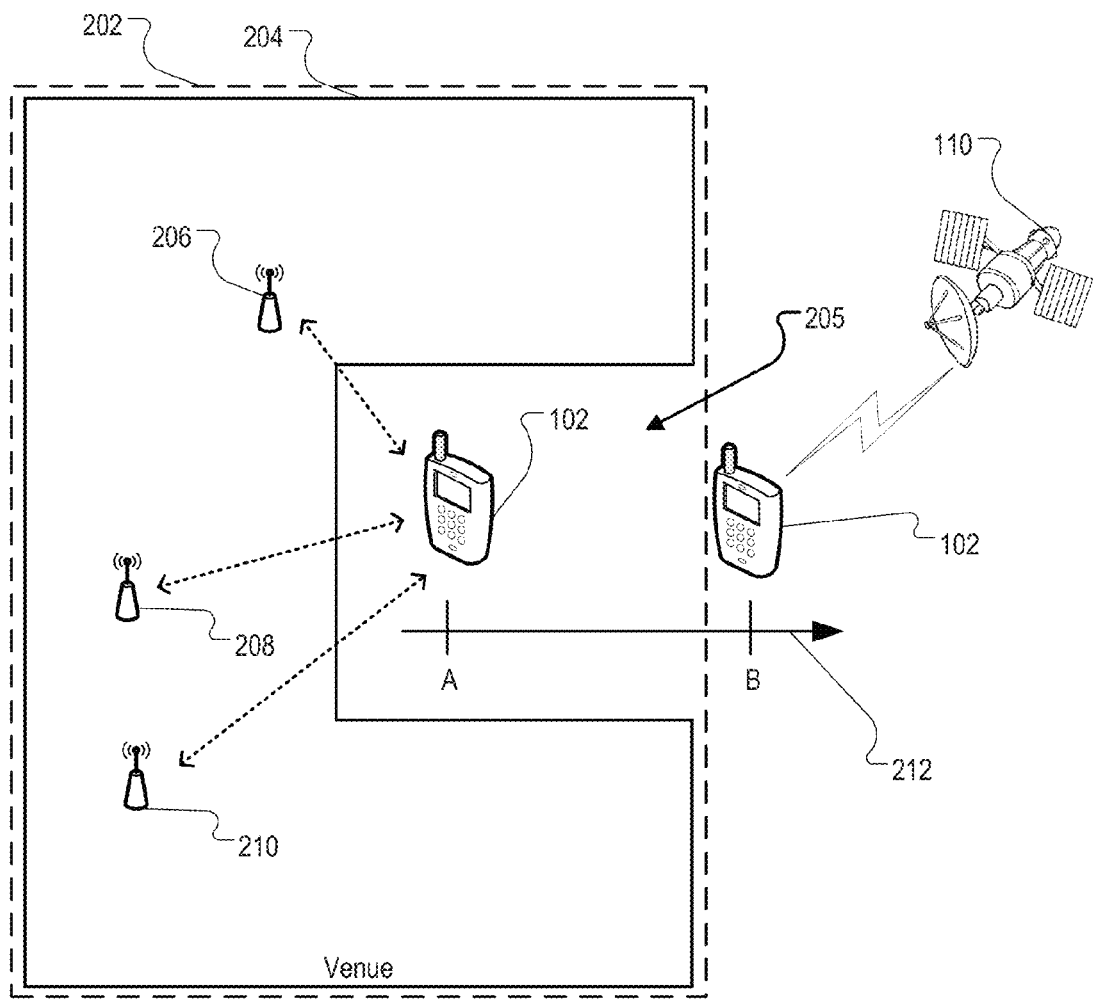
FIG. 2 is a diagram illustrating an exemplary venue-independent state and an exemplary venue-specific state.

FIG. 2 is a diagram illustrating an exemplary venue-independent state and an exemplary venue-specific state. The exemplary states can be venue-independent state 104 and venue-specific state 106 of FIG. 1, respectively. Based on whether mobile device 102 is in venue-independent state 104 or venue-specific state 106, mobile device 102 can determine in which manner mobile device 102 estimates a location, and in which manner the location is displayed to a user. In some implementations, venue-independent state 104 and venue-specific state 106 can respectively correspond to an outdoor state in which mobile device is located outdoors, and an indoor state in which mobile device is located indoors. In some implementations, venue-independent state 104 and venue-specific state 106 may not exactly correspond to whether mobile device 102 is physically located outdoors or indoors.

In the example of FIG. 2, initially, mobile device 102 can be located at venue 202 (represented in dashed line in FIG. 2). A venue, e.g., venue 202 or venue 122 of FIG. 1, can be a space accessible by a pedestrian. A pedestrian can be a human or a device that moves at a speed that is similar to a human's walking or running speed. The venue can include one or more constraints limiting the pedestrian's movement in the space. These constraints can include, for example, map constraints (e.g., walls, railings, or cubicle separators), pathway constraints (e.g., road signs, where a pedestrian walking on a pathway defined by road signs tends to follow the pathway), or pedestrian motion constraints (e.g., a pedestrian cannot move faster than X miles per hour, or move vertically when not on a stairway or in an elevator). The venue can be a physical structure. The physical structure can be closed (e.g., an office building) or open (e.g., an open stadium). The space can be indoor space inside of the physical structure, or space inside of a bounding space of the physical structure if the physical structure is open. The venue can be mobile (e.g., an airplane, a cruise ship, or a mobile oil platform).

In the example of FIG. 2, venue 202 can include structure 204 and space 205 enclosed by structure on one or more sides. Structure 204 can be a "C" shaped multi-story office building. Space 205 can be a rectangular space enclosed by structure 204 on three sides and having a fourth side that is open and unobstructed. Space 205 can be an outdoor space, or a semi-outdoor space having a cover (e.g., a glass or plastic roof or an awning). When mobile device 102 is in structure 204, mobile device 102 may not receive clear GPS signals from satellites 110. Mobile device 102 can determine a fingerprint location of mobile device 102 using signal sources 206, 208, and 210. Signal sources 206, 208, and 210 can be wireless access points the signal of which mobile device 102 can detect when mobile device 102 is in structure 204.

Mobile device 102 can determine whether mobile device 102 is in venue-specific state 106 or venue-independent state 104 can be determined based on at least one of (1) which manner of location determination is more reliable and accurate, or (2) which manner of location presentation can provide information that is more useful to a user. Whether mobile device 102 is in venue-specific state 106 or venue-independent state 104 often does, but might not always do, correspond to whether mobile device 102 is physically located indoors or outdoors.

For example, when mobile device 102 is located at location A, outside of structure 204 and in space 205, mobile device 102 can determine that GPS signals from satellites 110, although detectable, are intermittent or otherwise subject to interference (e.g., from structure 204). Accordingly, mobile device 102 can determine that using GPS signals to determine a location may be slow or error prone. Meanwhile, mobile device 102 can determine that signals from signal sources 206, 208, and 210 can be detected sufficiently clearly such that a location determined based on the signals from signal sources 206, 208, and 210 can have a high confidence value.

In addition, mobile device 102 can determine that, at location A, a user is sufficiently close to structure 204 such that a map of venue 202, which may indicate constraints of movements of the user in space 205 (e.g., a pathway, a fence, or a pond), is more useful to the user than a street map indicating a street address of structure 204. Accordingly, mobile device 102 can determine that mobile device 102 better off to determine a location using signal sources 206, 208, and 210, and to present a venue map. Based on this determination, mobile device 102 can determine that mobile device 102 is in venue-specific state 106, although mobile device 102 is physically located outdoors.

Likewise, when mobile device 102 is physically located indoors in structure 204, on some occasions, mobile device 102 can determine that mobile device 102 is better off determining a location using GPS signals or other signals and presenting a street map. Accordingly, mobile device 102 can determine that mobile device 102 is in venue-independent state 104. This can happen, for example, if mobile device 102, located in a building, can detect no wireless access points, if mobile device 102 does not have a venue map of the building, and if mobile device 102 can only determine a location based on signals from a cell tower of cellular network.

After mobile device 102 moves from location A to location B following motion path 212, mobile device 102 can determine that GPS signals from satellites 110 are sufficiently strong and stable for determining a GPS location. In contrast, signals from signal sources 206, 208, and 210 can be weak (due to increased distances between mobile device 102 and signal sources 206, 208, and 210). In addition, mobile device 102 can determine that location B is outside of the venue map of venue 202. Mobile device 102 can determine that, now, a venue map of venue 202, if displayed, may have only limited value to the user, whereas a street map showing neighboring buildings and street intersections may be more useful. Accordingly, mobile device 102 can determine that mobile device 102 is in venue-independent state 102. Mobile device 102 can determine the time that mobile device 102 transitions from venue-specific state 106 to venue-independent state 102 using a probability mobile based on conditions of the transition and readings from sensors of mobile device 102. Additional details on determining the time of transition will be described below in reference to FIG. 5.

State Transition Triggers

Figure 3:
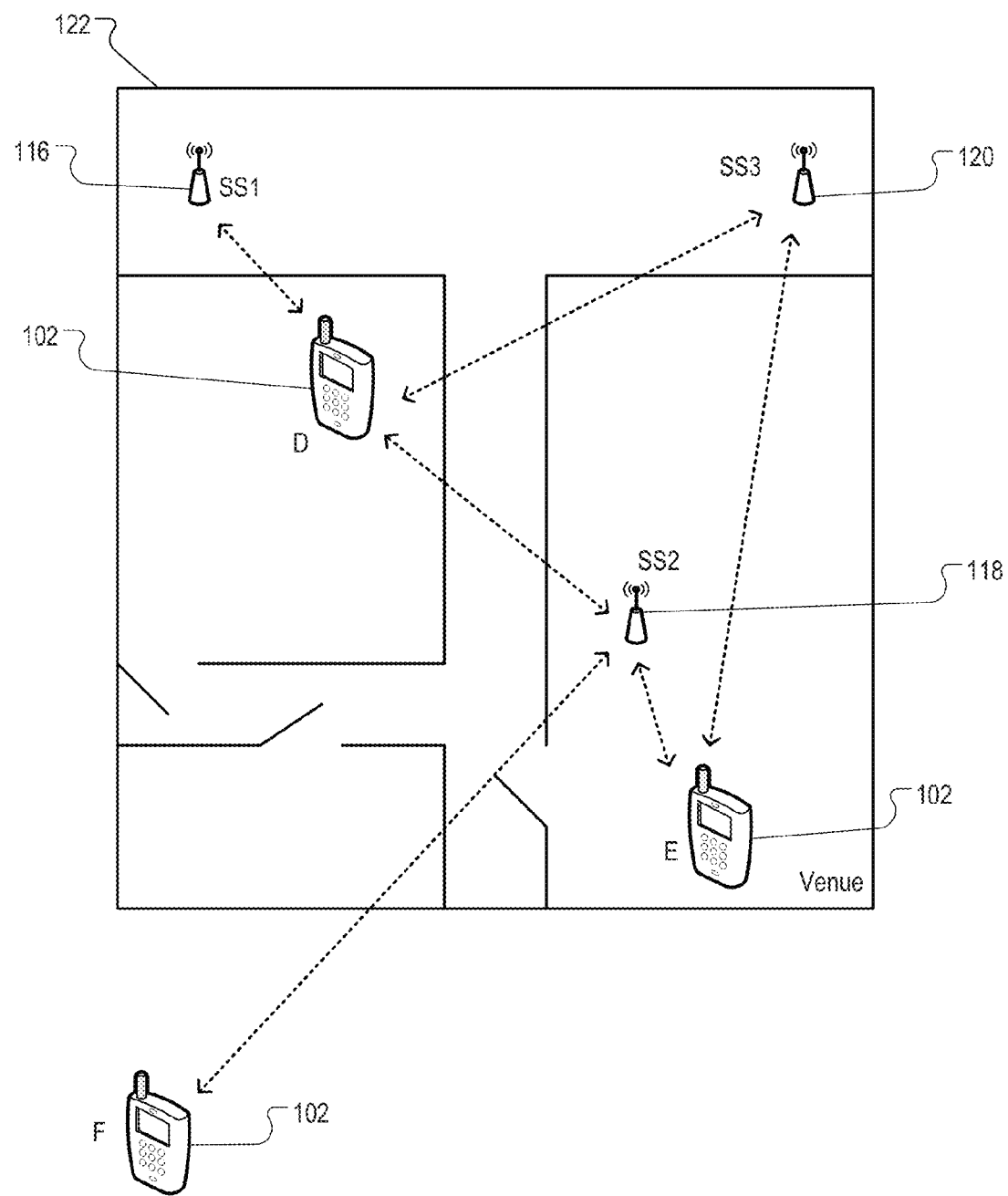
FIG. 3 is a diagram illustrating exemplary techniques of managing states of location determination based on signal sources of a venue.

FIG. 3 is a diagram illustrating exemplary techniques of managing states of location determination based on signal sources of a venue. Exemplary mobile device 102 can determine a state of location determination, and when to switch the state, based on detection or measurements (or lack of detection and lack of measurements) of signals from one or more of exemplary signal sources 116, 118, and 120. Each of signal sources 116, 118, and 120 can be a signal source that is configured to transmit a signal that is detectable by a sensor of mobile device 102. For example, a signal source can be an RF signal source, a light source, a sound source, a heat source, or a magnetic field source. The signal from each signal source can attenuate over distance from the corresponding signal source before reaching mobile device 102. Each of signal sources 116, 118, and 120 can be associated with venue 122 in a location fingerprint database.

The location fingerprint database can include, for each location among multiple locations in venue 122, expected measurements (or lack of measurements) of signals from signal sources 116, 118, and 120, variance of the expected measurements, and weights of the expected measurements. When mobile device 102 receives signals from one or more of signal sources 116, 118, and 120, mobile device 102 can determine a location of mobile device 102 at venue 122 (e.g., in a hallway, office, or conference room) based on statistical classification. The statistical classification can classify measurements of the signals as measured by mobile device 102 into one or more categories (or "bins") defined by the expected measurements stored in the location fingerprint database. Each category can correspond to a location at venue 122 and be associated with a probability value indicating how well the measured measurements match the expected measurements at the corresponding location. Mobile device 102 can then determine an estimated location (the fingerprint location) based on a category associated with a probability value indicating the best match. The measurements and expected measurements can include, for example, a received signal strength indication (RSSI) or a round-trip time when signal sources 116, 118, and 120 are wireless access points, a temperature when signal sources 116, 118, and 120 are heat sources, a sound pressure level when signal sources 116, 118, and 120 are sound sources, a light intensity or spectrum when signal sources 116, 118, and 120 are light sources. The location fingerprint database can be hosted by a server. The server can provide a portion of data in the location fingerprint database that are associated with venue 122 to mobile device 102 when mobile device 102 approaches or is located at venue 122.

Mobile device 102 can determine whether mobile device 102 is in venue-specific state 106 based on (1) at least how many signal sources mobile device 102 can detect and (2) how good are the signals from those signal sources. Mobile device 102 can determine that, if mobile device 102 detects at least an entrance signal source threshold number or percentage of signal sources associated with a venue, and that a measurement of signals from each of the signal sources satisfies an entrance signal measurement threshold, then mobile device is in venue-specific state 106. Each of the entrance signal source threshold and entrance signal measurement threshold can be a pre-specified or real-time determined value.

For example, the entrance signal source threshold can be at least two signal sources, or more than 60% of signal sources. The entrance signal measurement threshold can be X dB as measured in RSSI. At location D, mobile device 102 can receive signals from each of signal sources 116, 118, and 120. In addition, at location D, an RSSI from each of signal sources 116, 118, and 120 exceeds X dB. Mobile device 102 can then determine that mobile device 102 satisfies the entrance signal source threshold and the entrance signal measurement threshold, and is in venue-specific state 106. In addition, venue-specific state 106 can be associated with venue 122. If, during a previous state determination, mobile device 102 was in venue-independent state 104, mobile device 102 can switch directly from the venue-independent state to the venue-specific state upon the detection, indicating that mobile device 102 has entered venue 122.

In contrast, mobile device 102 can determine whether mobile device 102 is in venue-independent state 104 based on (1) at most how many signal sources mobile device 102 can detect and (2) how bad are the signals from those signal sources. Mobile device 102 can determine that, if mobile device 102 detects at most an exit signal source threshold number or percentage of signal sources associated with a venue, and that a measurement of signals from each of the signal sources satisfies an exit signal measurement threshold, then mobile device is in venue-independent state 104. Each of the exit signal source threshold and exit signal measurement threshold can be a pre-specified or real-time determined value. The exit signal source threshold can be no more than one signal sources or less than 40% of signal sources. The exit signal measurement threshold can be Y dB as measured in RSSI.

For example, at location F, mobile device 102 can receive signals only from signal sources 118. In addition, an RSSI from signal source 118 is less than Y dB. Mobile device 102 can then determine that mobile device 102 satisfies the exit signal source threshold and the exit signal measurement threshold. Accordingly, mobile device 102 can determine that mobile device 102 is in venue-independent state 104. The venue-independent state can be associated with venue 122. If, during a previous state determination, mobile device 102 was in venue-specific state 106 in association with venue 122, mobile device 102 can switch directly from the venue-specific state to the venue-independent state upon the detection, indicating that mobile device 102 has exited venue 122.

The entrance signal source threshold can be stricter, e.g., higher, than the exit signal source threshold (e.g., requiring higher number of signal sources). Likewise, the entrance signal source threshold can be stricter than the exit signal source threshold (e.g., requiring a higher RSSI measurement). Accordingly, mobile device 102 can be located at a location that neither all the entrance thresholds nor all the exit thresholds are satisfied. For example, mobile device 102 can be located at location E, where mobile device 102 detects two signal sources 118 and 120 (satisfying the entrance signal source threshold), but determines that an RSSI from signal source 120 does not reach X dB (failing the entrance signal source entrance threshold). Mobile device 102 can determine a probability that mobile device 102 is in venue-independent state 104 or venue-specific state 106 is not sufficient, in itself, to indicate which state mobile device 102 is in. Mobile device 102 can then transition into transit state 108, where mobile device 102 can use one or more sensors other the sensor that detected the signal sources 118 and 120 (e.g., a hygrometer or microphone) to confirm if a transition has occurred or needs to occur.

In transit state 108, mobile device 102 can adjust the probability that mobile device 102 is in venue-specific state 106 or venue-independent state 104 using readings from other sensors. If the adjusted probability reaches a probability threshold for transitioning into venue-specific state 106, mobile device 102 can transition into the venue-specific state 106. If the adjusted probability reaches a probability for transitioning into venue-independent state 104, mobile device 102 can transition into venue-independent state 104. If the adjusted probability does not reach either threshold, mobile device 102 can stay in transit state 108 until one of the thresholds is reached.

For example, at location E, when mobile device 102 is in transit state 108, mobile device 102 can measure air pressure using a barometer built into or connected to mobile device 102 to estimate whether mobile device 102 is temporarily losing signal because mobile device 102 is traveling between floors in an elevator with signal-blocking walls. Mobile device 102 can compare the measured air pressure with previously measured air pressure. If the measured air pressure increases or decreases, mobile device 102 can increase the probability that mobile device 102 is in venue-specific state 106. In addition, mobile device 102 can measure the duration of the air pressure change. If the duration is long and steady, e.g., consistent with a reasonable speed of elevator, mobile device 102 can confirm the venue-specific state probability. If the duration is short and sudden, e.g., consistent with a reasonable speed of opening or closing a door of a closed room, mobile device 102 can use other sensors to determine how much to adjust the probability.

Additionally or alternatively, at location E, when mobile device 102 is in transit state 108, mobile device 102 can measure background noise using a microphone built into or connected to mobile device 102 to estimate whether mobile device 102 is located in a high-wind noise environment. Mobile device 102 can compare the measured background noise with previously measured background noise. If the measured background noise decreases, mobile device 102 can increase the probability for transitioning from venue-independent state 104 into venue-specific state 106. If the measured background noise increases, mobile device 102 can increase the probability for transitioning from venue-specific state 106 into venue-independent state 104.

Additionally or alternatively, at location E, when mobile device 102 is in transit state 108, mobile device 102 can measure humidity using a hygrometer built into or connected to mobile device 102 to estimate whether mobile device 102 is located in an air-conditioned environment. Mobile device 102 can compare the measured humidity with a previously measured humidity. If the measured humidity decreases, mobile device 102 can increase the probability for transitioning from venue-independent state 104 into venue-specific state 106. If the measured humidity increases, mobile device 102 can increase the probability for transitioning from venue-specific state 106 into venue-independent state 104.

Additionally or alternatively, at location E, when mobile device 102 is in transit state 108, mobile device 102 can measure temperature using a thermometer built into or connected to mobile device 102 to estimate whether mobile device 102 is located in a heated or cooled room. Mobile device 102 can compare the measured temperature with a room temperature range (e.g., between T1 degree centigrade or Fahrenheit and T2 degree centigrade or Fahrenheit). If the measured temperature is outside the room temperature range (e.g., as minus five degrees centigrade), mobile device 102 can increase the probability of being in venue-independent state 104.

Additionally or alternatively, at location E, when mobile device 102 is in transit state 108, mobile device 102 can measure a light spectrum using a light sensor built into or connected to mobile device 102 to estimate whether mobile device 102 is located in sunlight. Mobile device 102 can compare light intensity in a specified wavelength (e.g., in the ultraviolet (UV) band) with a given intensity threshold (e.g., an expected UV intensity from behind a glass window). If the measured light intensity in the specified wavelength exceeds the intensity threshold, mobile device 102 can increase the probability of being in venue-independent state 104.

If none of the sensor readings, used alone, is insufficient to confirm a state of mobile device 102, mobile device 102 can combine the sensor readings. If the combined sensor readings are still insufficient to confirm the state, mobile device 102 can take the measurements again using the sensors, until a confirmation is confirmed.

Figure 4:
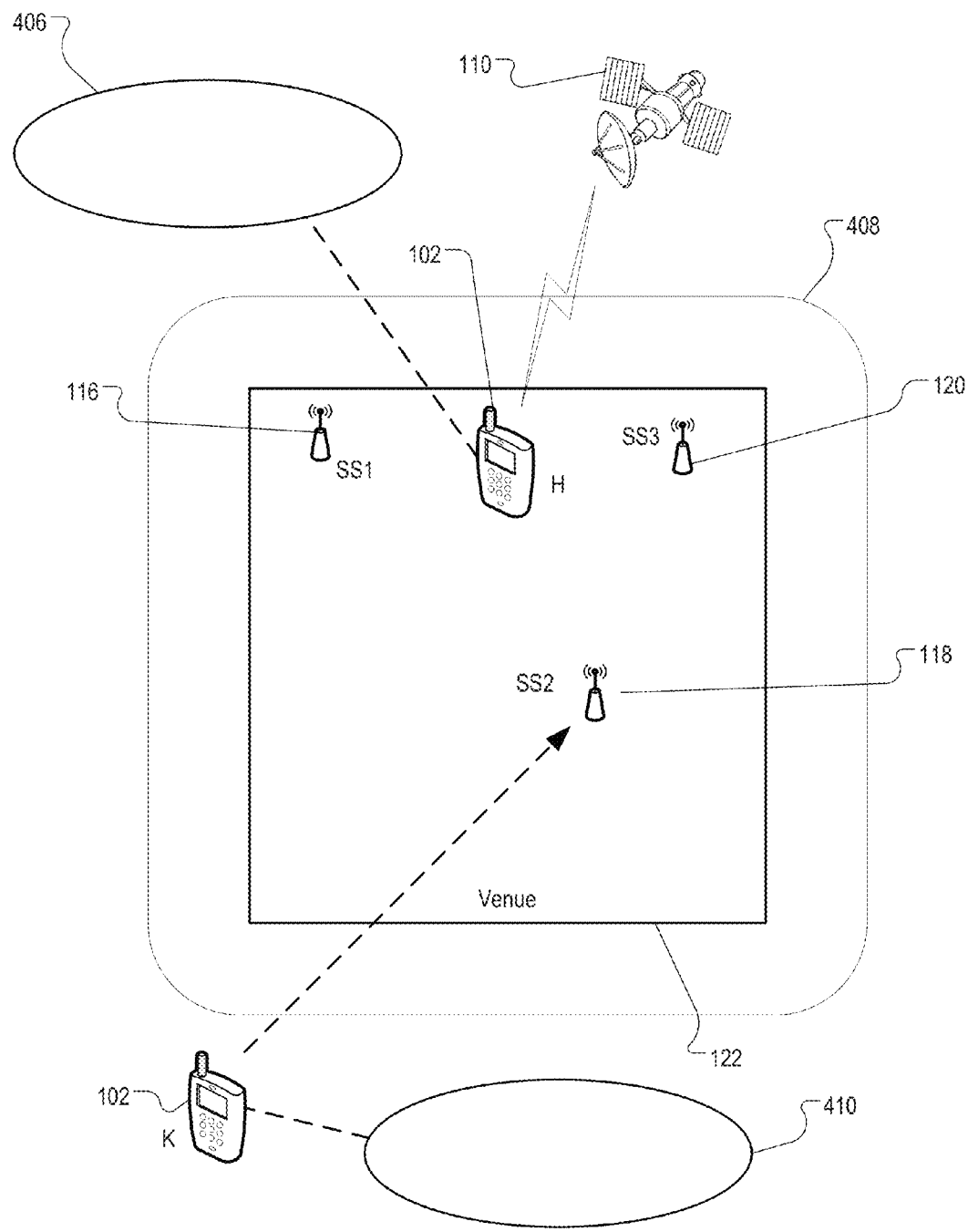
FIG. 4 is a diagram illustrating exemplary techniques of managing states of location determination using location errors.

FIG. 4 is a diagram illustrating exemplary techniques of managing states of location determination using location errors. Conventionally, a mobile device determines a location using GPS signals whenever GPS signals are available. This may lead to errors, when the GPS signals are partially obstructed by barriers. Mobile device 102 implementing state management can detect the errors and utilizing the errors to determine a state of location determination.

At a given time, mobile device 102 at venue 122 can be at location H. Location H can be inside a building and near a large window. At location H, mobile device 102 can detect signal sources 116, 118, and 120. Signal sources 116, 118, and 120 can be associated with venue 122 in a location fingerprint database stored on mobile device 102. Mobile device 102 can determine a fingerprint location using measurements of signals from signal sources 116, 118, and 120. Based on the measurements and the location fingerprint database, mobile device 102 can determine that the fingerprint location of mobile device 102 is location H.

In addition, mobile device 102 can receive GPS signals from satellites 110. The building of venue 122 can block mobile device 102 from receiving signals from some GPS satellites while allowing mobile device 102 to receive signals from some other GPS satellites. Because of the interference by the building, mobile device 102, when determining a GPS location of mobile device 102, can determine that the GPS location is location 406.

Location H and location 406 can be different and in conflict with one another. Mobile device 102 can determine a state of location determination of mobile device 102. Based on the state, mobile device 102 can determine which of location H or location 406 shall be chosen over the other and be displayed to a user. Mobile device 102 can make the determination based on footprint 408 of venue 122.

Footprint 408 of venue 122 can be associated with the location fingerprint database of mobile device 102. The location fingerprint database can include location fingerprint data usable by mobile device 102 to determine a location using statistical classification. The location fingerprint data can be associated with error margins. The error margins can indicate that, given potentially different measurements by differences in sensor configuration, differences in the environment (e.g., people moving between a signal source and mobile device 102), or differences in orientation of mobile device 102, a fingerprint location determined based on the statistical classification may not be always accurate. In addition, mobile device 102 can estimate the inaccuracy using a probability. The probability can measure a likelihood that mobile device 102 is actually located more than a distance (d) away from a fingerprint location when the fingerprint location determined is associated with a probability (p) associated with a category as calculated as part of the statistical classification. Footprint 408 of venue 122 can be determined by applying the distance (d) to part or whole of venue 122. Accordingly, for example, footprint 408 can appear to be venue 122 extended by distance (d) from each side. The distance (d) can be determined based on a pre-specified certainty (p).

In FIG. 4, when mobile device 102 determines that (1) the fingerprint location of mobile device 102 is location H; and (2) the GPS location of mobile device 102 is location 406. Mobile device 102 can determine that location 406 is outside of footprint 408, and that an orthogonal distance between location 406 and footprint 408 exceeds a threshold distance. Based on the orthogonal distance, mobile device 102 can determine that the probability that location 406 is correct falls below a acceptance threshold probability value, and thus shall be rejected. Mobile device 102 can then determine that mobile device 102 is in venue-specific state 106. Mobile device 102 can accept that location H is a correct location, and provide location H for display on a venue map to a user.

At a given time, mobile device 102 can be at location K. At location K, mobile device 102 is at a distance away from venue 122 but can still receive signals from one or more of signal sources 116, 118, and 120. Using a location fingerprint database and statistical classification, mobile device 102 can determine that the fingerprint location of mobile device 102 is location 410. Mobile device 102 can determine that location 410 is outside of footprint 408, and that an orthogonal distance between location 410 and footprint 408 exceeds a threshold distance. Based on the orthogonal distance, mobile device 102 can determine that the probability that location 410 is correct falls below the acceptance threshold probability value, and thus shall be rejected. Mobile device 102 can then determine that mobile device 102 is in venue-independent state 104. Mobile device 102 can accept that location K, determined by a procedure other than statistical classification using the location fingerprint database (e.g., determined using GPS signals or cellular signals), is a correct location. Mobile device 102 can provide location K for display on a street map to a user.

Figure 5:
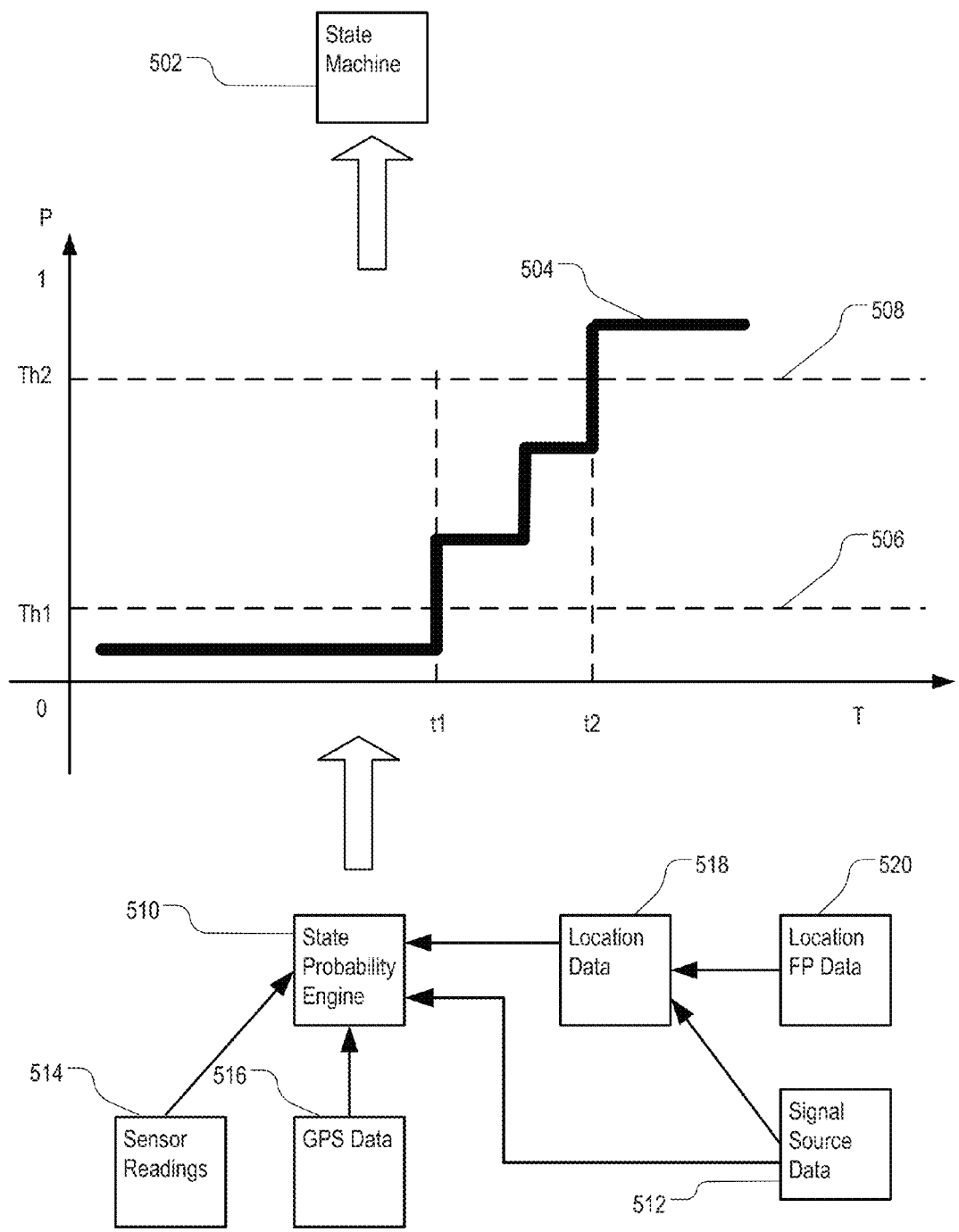
FIG. 5 is a diagram illustrating exemplary techniques of managing states of location determination based on multiple sensors of a mobile device.

FIG. 5 is a diagram illustrating exemplary techniques of managing states of location determination based on multiple sensors of a mobile device. Mobile device 102 (of FIG. 1) can include state machine 502. State machine 502 can be a finite state machine including venue-independent state 104, venue-specific state 106, and transit state 108 for mobile device 102. At a given time, mobile device 102 can be in one of the states of state machine 502.

State machine 502 can manage transition between the states based on triggers. The triggers can include changes in values of probability 504 that mobile device 102 is in a given state. For convenience, probability 504 will be described as a probability that mobile device is in venue-independent state 104. Likewise, probability 504 can be a probability that mobile device 102 is in venue-specific state 106. In the example shown, probability 504 can change along time T. Before time t1, probability 504 can be below a pre-specified or real-time calculated indoor threshold 506. Accordingly, state machine 502 can determine that mobile device 102 is in venue-specific state 106.

During time period from t1 to t2, probability 504 can be above indoor threshold 506 but below a pre-specified or real-time calculated outdoor threshold 508. Accordingly, state machine 502 can determine that mobile device 102 is in transit state 108. After time t2, probability 504 can be above outdoor threshold 508. Accordingly, state machine 502 can determine that mobile device 102 is in venue-independent state 104. The triggering event that triggered the transition from venue-specific state 106 to transit state 108 is that probability 504 increases above indoor threshold 506 at time t1. The triggering event that triggered the transition from transit state 108 to venue-independent state 104 is that probability 504 increases above outdoor threshold 508 at time t2. A decrease of probability 504 can likewise trigger a transition, if the decrease causes probability 504 to cross outdoor threshold 508 or indoor threshold 506.

Probability 504 can be continuous or discrete. When a particular event happens, probability 504 can almost instantaneously increase or decrease in value. For example, jumps of probability 504 at time t1 and time t2 can be caused by one or more sensor readings or changes in sensor readings, GPS signals as received by mobile device 102, or signals from signal sources as received by mobile device 102.

Readings from a single sensor can cause probability 504 to jump from below indoor threshold 506 to above outdoor threshold 508, or drop from above outdoor threshold 508 to below indoor threshold 506, almost instantaneously. For example, mobile device 102 can initially receive no signal from signal sources but clear GPS signals, and then be turned off. Later, when mobile device 102 is turned on again, mobile device 102 can receive no GPS signals but can receive signal from every signal source associated with a venue. When the almost instantaneous increase or decrease causes probability 504 to cross both thresholds (t2−t1≈0), state machine 502 can determine that mobile device 102 has transitioned from venue-independent state 104 to venue-specific state 106 or from venue-specific state 106 to venue-independent state 104 without first transitioning to transit state 108.

Probability 504 can be calculated by state probability engine 510. State probability engine 510 can be a component of mobile device 102 configured to calculate probability 504 based on various inputs. For example, state probability engine 510 can determine probability 504 at time t using signal source data 512 and sensor readings 514 signal source data 512 can include measurements of signal sources detected by mobile device 102. State probability engine 510 can determine probability 504 using signal source data 512 and sensor readings 514 as described above in reference to FIG. 3. State probability engine 510 can determine probability 504 at time t using GPS data 516 and location data 518. GPS data may include a location of mobile device 102 as estimated using GPS signals. Location data 518 can include a location of mobile device 102 as estimated be statistical classification using location fingerprint data 520 and signal source data 512. State probability engine 510 can determine probability 504 using GPS data 516 and location data 518 using techniques described above in reference to FIG. 4. State probability engine 510 can determine probability 504 using a sequence of calculations based on a combination of the various data and readings.

Exemplary System Components

Figure 6:
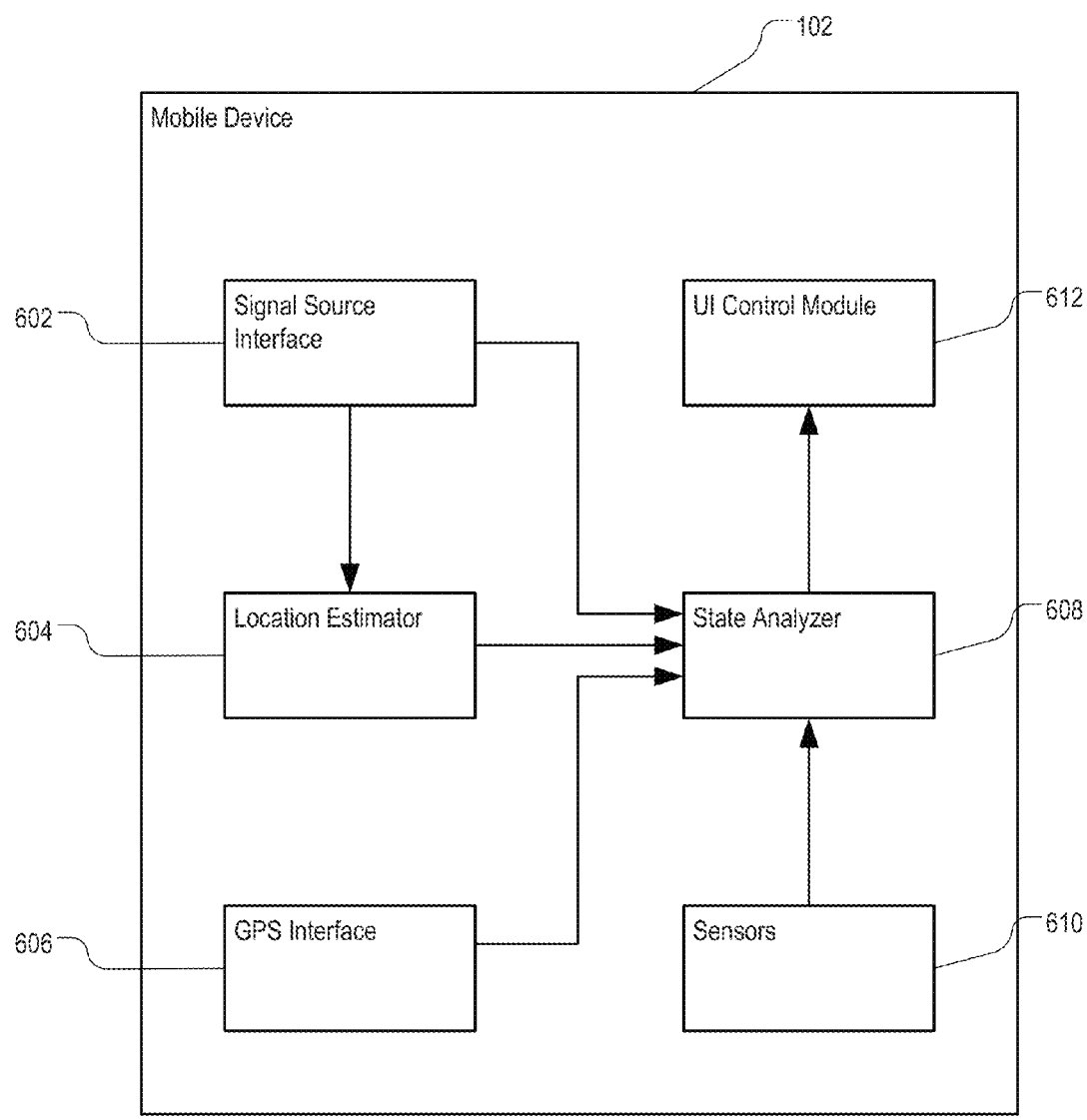
FIG. 6 is a block diagram of an exemplary system for managing states of location determination.

FIG. 6 is a block diagram of an exemplary system for managing states of location determination. The system include mobile device 102 of FIG. 1. Mobile device 102 can include one or more computer processor configured to manage the states of location determination.

Mobile device 102 can include signal source interface 602. Signal source interface 602 is a component of mobile device 102 configured to detect one or more signal sources (e.g., signal sources 116, 118, and 120 of FIG. 1) and take measurements of signals from the signal sources. Signal source interface 602 can be a wireless interface for detecting wireless access points and measure RSSI or round trip time of signals from the wireless access points. Signal source interface 602 can be configured to provide the measurements as signal source data 512 (of FIG. 5) to location estimator 604 and state analyzer 608.

Location estimator 604 is a component of mobile device 102 configured to determine a fingerprint location of mobile device 102 using the measurements from signal source interface 602 and location fingerprint data. Location estimator 604 can determine the location by performing statistical classification of the measurement using the location finger print data. The fingerprint location of mobile device 102 as estimated by location estimator 604 can be location data 518 of FIG. 5. Location estimator 604 can provide the fingerprint location to state analyzer 608.

Mobile device 102 can include GPS interface 606. GPS interface 606 is a component of mobile device 102 configured to interface with a GPS subsystem of mobile device 102 and provide a GPS location of mobile device 102 as estimated by the GPS subsystem to state analyzer 608. The GPS location can be GPS data as described above in reference to FIG. 5.

Mobile device 102 can include sensors 610. Sensors 610 can include sensors that can include sensors operable to assist mobile device to determine a state of location determination. For example, sensors 610 can include a barometer for measuring air pressure usable to determine whether mobile device 102 is moving between floors. Sensors 610 can include a microphone for measuring sound level usable to determine whether mobile device 102 is at a high wind noise area. Sensors 610 can include a light sensor for measuring light intensity and spectrum usable to determine whether mobile device 102 is in direct sunlight. Sensors 610 can include a thermometer for measuring temperature usable to determine if mobile device 102 is located in an area having room temperature. Sensors 610 can include a hygrometer for measuring air humidity usable to determine whether mobile device 102 is in an air-conditioned environment. Sensors 610 can include an accelerometer for measuring linear or angular acceleration usable to determine if a user of mobile device 102 is hiking or jogging, which is likely to occur outdoors. Sensors 610 can include a magnetometer for measuring intensity and direction of a magnetic field usable to determine whether mobile device 102, when appearing to be in an enclosed space, is located in an enclosure (e.g., a car) insulating magnetic fields of the Earth. Measurements of sensors 610 can be sensor readings 514 of FIG. 5. Sensors 610 can provide the measurements to state analyzer 608.

State analyzer 608 is a component of mobile device 102 configured to determine a state of mobile device 102 and determine if a transition between states has occurred or shall occur. State analyzer 608 can determine the state and occurrence of the transition based on data received from signal source interface 602, location estimator 604, GPS interface 606, and sensors 610. State analyzer 608 can include state machine 502 and state probability engine 510 as described above in reference to FIG. 5.

Based on the state of mobile device 102 as determined by state analyzer 608, state analyzer 608 can choose one of the location as provided by location estimator 604 or the location as provided by GPS interface 606 as an estimated location of mobile device 102. State analyzer 608 can provide the estimated location and the state to user interface module 612.

User interface module 612 is a component of mobile device 102 configured to select a user interface based on the state received from state analyzer 608. If the state is venue-specific state 106, user interface module 612 can select a venue map and a set of display rules (e.g., how to represent a current location or how to present a path) associated with the venue map. User interface module 612 can then present the estimated location received from state analyzer 608 on the venue map according to the display rules. If the state is venue-independent state 104, user interface module 612 can select a street map and a set of display rules associated with the street map. User interface module 612 can then present the estimated location received from state analyzer 608 on the street map according to the display rules. If the state is transit state 108, user interface module 612 can use a last-displayed map for display, or provide a prompt for warning the user that a current location determination is in progress.

Exemplary Procedures

Figure 7:
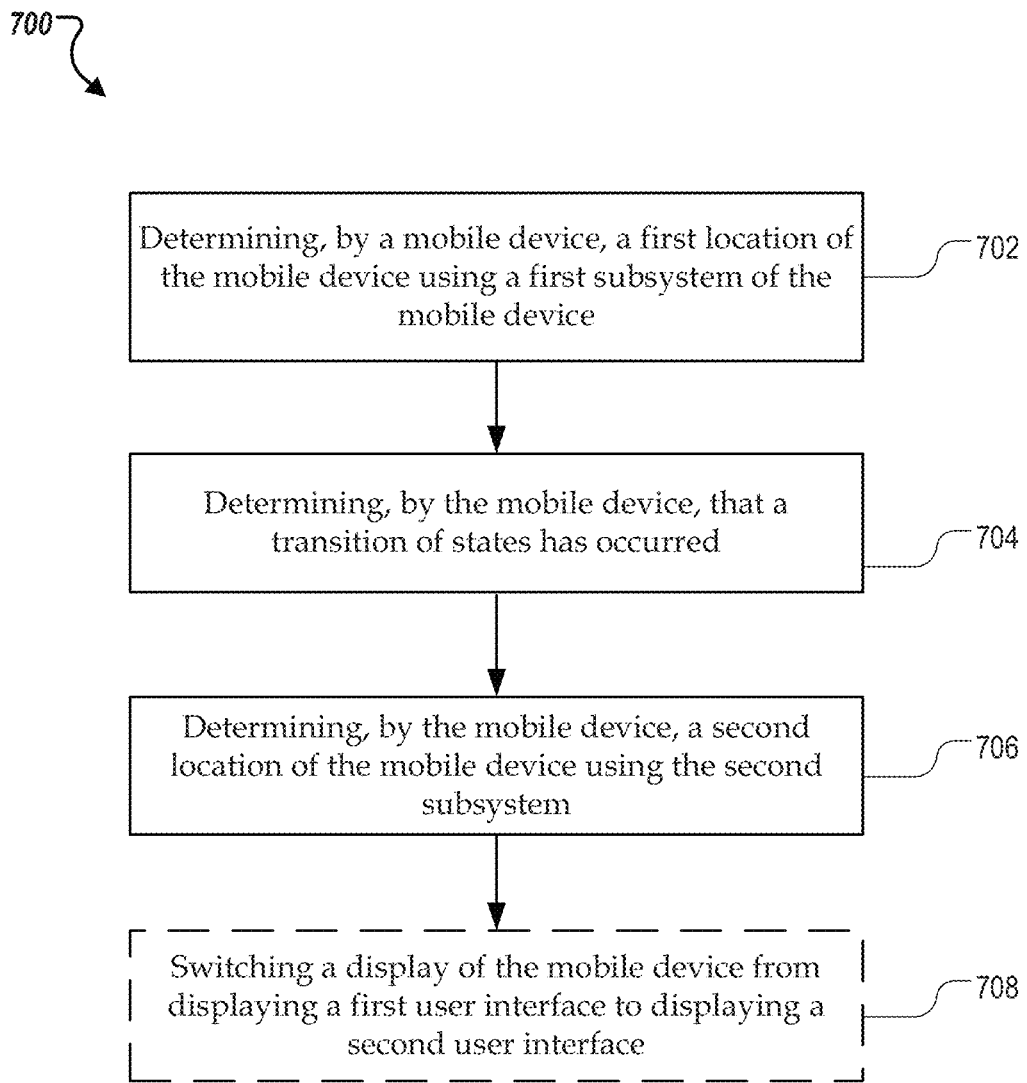
FIG. 7 is a flowchart of an exemplary procedure of monitoring a location fingerprint database.

FIG. 7 is a flowchart of exemplary procedure 700 of monitoring a location fingerprint database. Procedure 700 can be performed by mobile device 102 of FIG. 1.

Mobile device 102 can determine (702) a first location of mobile device 102 using a first subsystem of mobile device 102. The first subsystem can be a subsystem of mobile device 102 configured to determine a location of mobile device 102 using signals from a global satellite system (e.g., GPS), or a subsystem of mobile device 102 configured to determine a location of mobile device 102 using signals from signal sources, e.g., wireless access points.

Mobile device 102 can determine (704) that a transition of states has occurred. The transition of state can indicate that, after the transition, a location estimation by a second subsystem of the mobile device is expected to be more accurate than a location estimation by the first subsystem. The transition of state can include transitioning from a venue-specific state to a venue-independent state or transitioning from a venue-independent state to a venue-specific state.

The venue-dependent state can correspond to a state that mobile device 102 is located at a venue. The venue can include a space accessible by a pedestrian and one or more constraints of movements of the pedestrian. For example, the venue can be a building, and the venue-specific state can be an indoor state corresponding to a state in which mobile device 102 is located inside the building. The venue-independent state can correspond to a state that mobile device 102 is not located at a venue. For example, can be an outdoor state in which mobile device 102 is located outside of a building.

The venue can be associated with a location fingerprint database that stores location fingerprint data for each of multiple venues (e.g., office building, stadiums, museums, or shopping centers). The location fingerprint database can include multiple location fingerprints of each venue. Each location fingerprint can be associated with a sample location in the respective venue. Each location fingerprint can include expected measurements of signals from one or more signal sources by a mobile device located at the respective sample location.

In some implementations, mobile device 102 can determine that the transition of state has occurred when mobile device 102 detects that mobile device 102 has transitioned from the venue-specific state to the venue-independent state when (1) mobile device 102 cannot detect signals from the one or more signal sources associated with the venue in the location fingerprint database, or (2) when each measurement of signals from each of the one or more signal sources satisfies an exit threshold.

In some implementations, mobile device 102 can determine that the transition of state has occurred when mobile device 102 detects that mobile device 102 has transitioned from the venue-independent state to the venue-specific state when mobile device 102 when at least one measurement of signals from at least a threshold number of the one or more signal sources satisfies an entrance threshold. The entrance threshold can be higher than the exit threshold.

In some implementations, mobile device 102 can determine that the transition of state has occurred when mobile device 102 determines a tentative location of mobile device 102 using measurements of signals from one or more signal sources. Mobile device 102 can then determine that a transition from the venue-specific state to the venue-independent state has occurred when an error margin of the tentative location exceeds a convergence threshold. For example, mobile device 102 can determine, using signal measurements and a location fingerprint database, that, based on a statistical classification, mobile device 102 is located at a tentative location having an error margin that is from 0 to 90 degrees north latitude, and 0 to 180 degrees west longitude. This error margin can indicate that the statistical classification failed to converge to a meaningful location. Accordingly, mobile device 102 can determine that a transition from the venue-specific state to the venue-independent state has occurred.

In some implementations, mobile device 102 can determine that the transition of state has occurred when mobile device 102 determines that a probability that the transition has occurred has reached a threshold. Mobile device 102 can then trigger a measurement by a barometric pressure sensor. The barometric pressure sensor can be configured to detect air pressure change indicative of a movement of mobile device 102 between floors of a building. Mobile device 102 can then confirm that the transition (e.g., from the venue-independent state to the venue-specific state) has occurred based on readings of the barometric pressure sensor.

In some implementations, mobile device 102 can determine that the transition of state has occurred when mobile device 102 determines that a probability that the transition has occurred has reached a threshold. Mobile device 102 can then trigger a measurement using at least one of a hygrometer of mobile device 102 or a microphone of mobile device 102. Mobile device 102 can confirm that the transition has occurred when at least one of a set of events has happened. One event can be that a difference between a first humidity reading of the hygrometer and a second humidity reading of the hygrometer satisfied an estimated threshold humidity difference between an indoor environment and an outdoor environment. Another event can be that a difference between a first noise level reading of the microphone and a second noise level reading of the microphone satisfied an estimated threshold noise level difference between an indoor environment and an outdoor environment.

In some implementations, mobile device 102 can determine that the transition of state has occurred when mobile device 102 determines that an estimated location mobile device 102 is outside of a footprint of a venue. The footprint can be an area determined based on a shape and a size of the venue and a location calculation error margin. The location calculation error margin can be an error margin of a location calculated by mobile device 102 using measurements of signals from one or more signal sources if mobile device 102 is actually located at the venue. If the estimated location of mobile device 102 is outside of the footprint, mobile device 102 can determine that mobile device 102 has transitioned from the venue-specific state to the venue-independent state.

Upon determining that the transition of states has occurred, mobile device 102 can determine (706) a second location of mobile device 102 using the second subsystem.

Upon determining that the transition of states has occurred, mobile device 102 can switch (708) a display of mobile device 102 from displaying a first user interface configured for presenting the first location to displaying a second user interface configured for present the second location. The first user interface can include a venue map that includes an interior of a building. The second user interface can include a street map.

Exemplary Mobile Device Architecture

Figure 8:
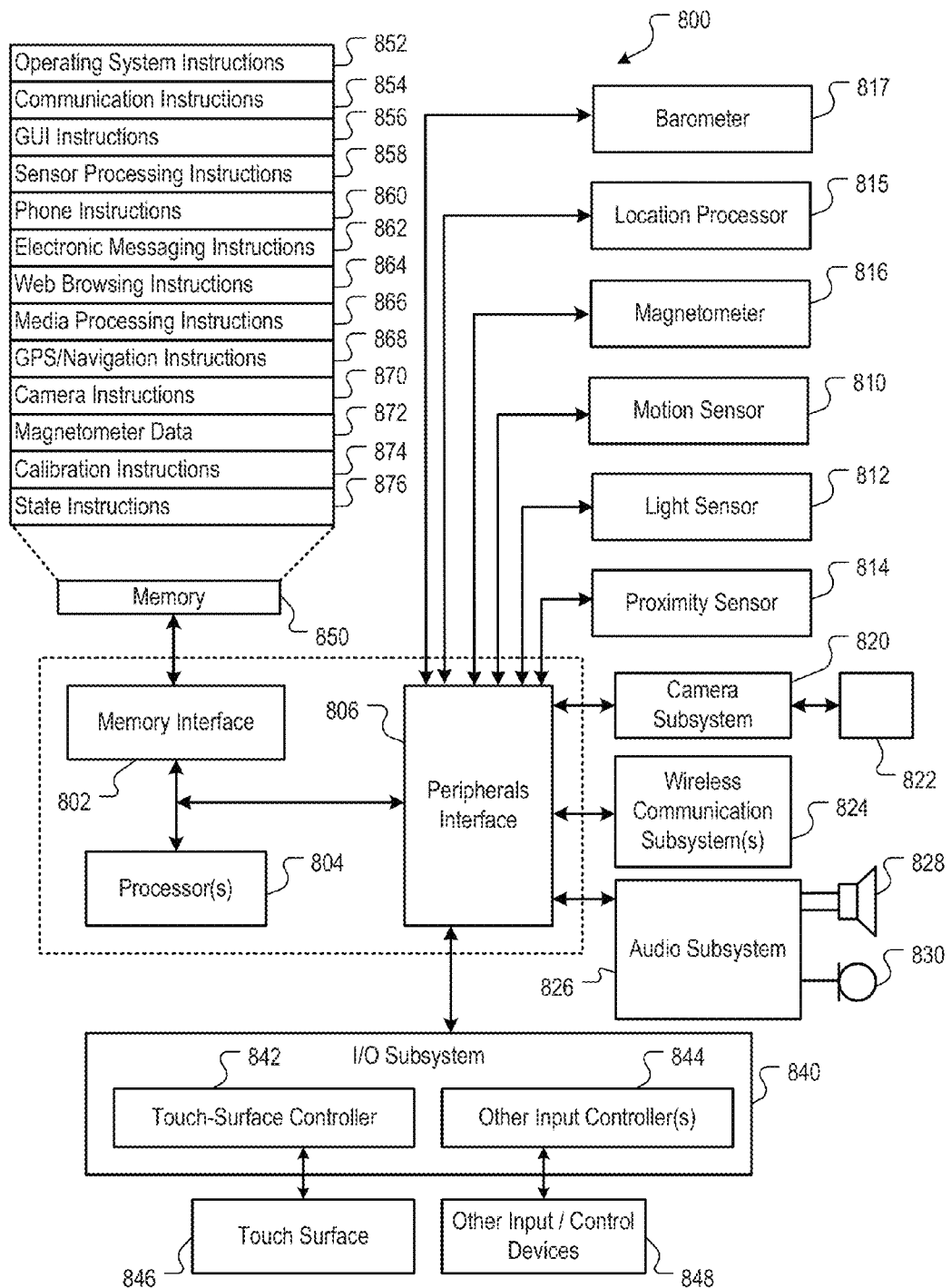
FIG. 8 is a block diagram illustrating an exemplary device architecture of a mobile device implementing the features and operations described in reference to FIGS. 1-7.

FIG. 8 is a block diagram of an exemplary architecture 800 for the mobile devices of FIGS. 1-7. A mobile device (e.g., mobile device 102) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in mobile device 102, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMax™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch surface controller 842 and/or other input controller(s) 844. Touch-screen controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to mobile device 102 on or off. The user may be able to customize a functionality of one or more of the buttons. The touch surface 846 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can store state instructions 876 that, when executed, can cause processor 804 to perform operations of location state management, including, for example, performing the operations of signal source interface 602, location estimator 604, GPS interface 606, state analyzer 608, and user interface module 612 as described above in reference to FIG. 6.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
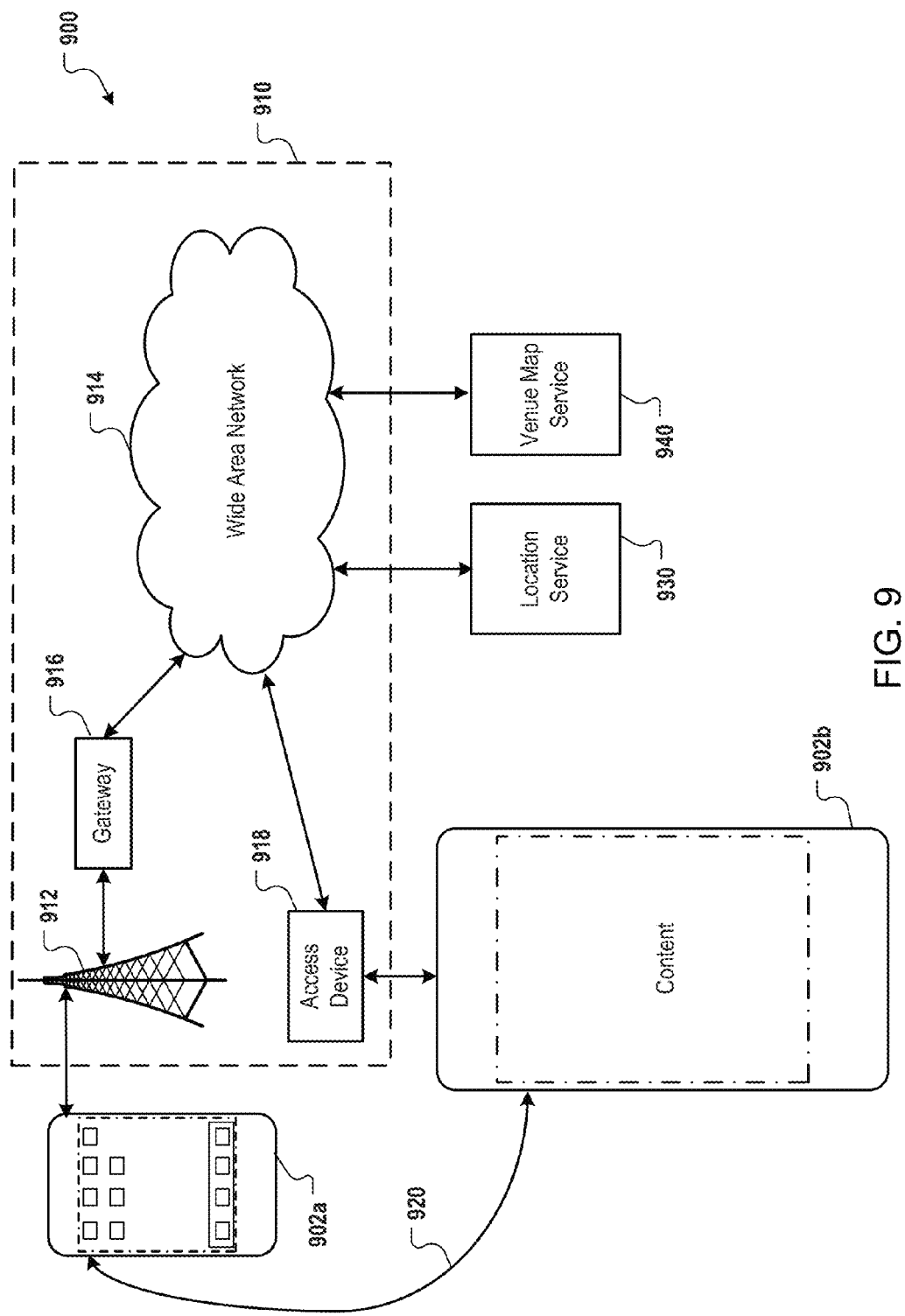
FIG. 9 is a block diagram of an exemplary network operating environment for the mobile devices of FIGS. 1-7.

FIG. 9 is a block diagram of an exemplary network operating environment 900 for the mobile devices of FIGS. 1-6. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

The mobile device 902a or 902b can, for example, communicate with one or more services 930 and 940 over the one or more wired and/or wireless networks. For example, one or more location services 930 can provide location fingerprint data to mobile devices 902a and 902b, provide updates of the location fingerprint data, and provide algorithms for determining a fingerprint location of mobile devices 902a and 902b. Venue map service 940 can provide map information to mobile devices 902a and 902b. The map information can include street maps or venue maps. Venue map service 940 can provide a venue map for a venue to mobile devices 902a and 902b when mobile devices 902a and 902b are located at the venue or are approaching the venue.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   determining, by a mobile device, a first location of the mobile device using a first subsystem of the mobile device;
   determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, wherein:

the venue-specific state corresponds to a state that the mobile device is located at a venue, the venue comprising a space accessible by a pedestrian and one or more constraints of movements of the pedestrian;

the venue-independent state corresponds to a state that the mobile device is not located at the venue; and determining that the transition of states has occurred comprises:

determining a tentative location of the mobile device using measurements of signals from one or more signal sources; and at least one of:

determining that a transition from the venue-specific state to the venue-independent state has occurred upon determining that an error margin of the tentative location exceeds a convergence threshold, or determining that the mobile device has transitioned from the venue-independent state to the venue-specific state upon determining that at least one measurement of signals from at least a threshold number of the one or more signal sources satisfies an entrance threshold; and in response to determining that the transition of state has occurred, determining, by the mobile device, a second location of the mobile device using the second subsystem.

2. The method of claim 1, wherein:
one of the first subsystem or second subsystem is configured to determine a location of the mobile device using signals from a global satellite system, and
another of the first subsystem or second subsystem is configured to determine a location of the mobile device using signals from one or more wireless access points.

3. The method of claim 1, comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

4. The method of claim 1, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

5. The method of claim 4, wherein determining that the transition of state has occurred comprises:
detecting that the mobile device has transitioned from the venue-specific state to the venue-independent state when the mobile device cannot detect signals from the one or more signal sources or when each measurement of signals from each of the one or more signal sources satisfies an exit threshold.

6. The method of claim 5, wherein the entrance threshold is higher than the exit threshold.

7. A system comprising:
a mobile device; and
a non-transitory computer-readable medium storing instructions operable to cause the mobile device to perform operations comprising:
determining a first location of the mobile device using a first subsystem of the mobile device;
determining that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, wherein:
the venue-specific state corresponds to a state that the mobile device is located at a venue, the venue comprising a space accessible by a pedestrian and one or more constraints of movements of the pedestrian;
the venue-independent state corresponds to a state that the mobile device is not located at the venue; and
determining that the transition of states has occurred comprises:
determining a tentative location of the mobile device using measurements of signals from one or more signal sources; and at least one of:
determining that a transition from the venue-specific state to the venue-independent state has occurred upon determining that an error margin of the tentative location exceeds a convergence threshold, or determining that the mobile device has transitioned from the venue-independent state to the venue-specific state upon determining that at least one measurement of signals from at least a threshold number of the one or more signal sources satisfies an entrance threshold; and
in response to determining that the transition of state has occurred, determining a second location of the mobile device using the second subsystem.

8. The system of claim 7, wherein:
one of the first subsystem or second subsystem is configured to determine a location of the mobile device using signals from a global satellite system, and
another of the first subsystem or second subsystem is configured to determine a location of the mobile device using signals from one or more wireless access points.

9. The system of claim 7, comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

10. The system of claim 7, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

11. The system of claim 10, wherein determining that the transition of state has occurred comprises:

detecting that the mobile device has transitioned from the venue-specific state to the venue-independent state when the mobile device cannot detect signals from the one or more signal sources or when each measurement of signals from each of the one or more signal sources satisfies an exit threshold.

12. The system of claim 11, wherein the entrance threshold is higher than the exit threshold.

13. A non-transitory computer-readable medium storing instructions operable to cause one or more processors to perform operations comprising:
   determining, by a mobile device, a first location of the mobile device using a first subsystem of the mobile device;
   determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, wherein:
      the venue-specific state corresponds to a state that the mobile device is located at a venue, the venue comprising a space accessible by a pedestrian and one or more constraints of movements of the pedestrian;
      the venue-independent state corresponds to a state that the mobile device is not located at the venue; and
      determining that the transition of states has occurred comprises:
         determining a tentative location of the mobile device using measurements of signals from one or more signal sources; and at least one of:
            determining that a transition from the venue-specific state to the venue-independent state has occurred upon determining that an error margin of the tentative location exceeds a convergence threshold, or determining that the mobile device has transitioned from the venue-independent state to the venue-specific state upon determining that at least one measurement of signals from at least a threshold number of the one or more signal sources satisfies an entrance threshold; and
   in response to determining that the transition of state has occurred, determining, by the mobile device, a second location of the mobile device using the second subsystem.

14. The non-transitory computer-readable medium of claim 13, wherein:
   one of the first subsystem or second subsystem is configured to determine a location of the mobile device using signals from a global satellite system, and
   another of the first subsystem or second subsystem is configured to determine a location of the mobile device using signals from one or more wireless access points.

15. The non-transitory computer-readable medium of claim 13, comprising:
   upon determining that the transition of states has occurred, switching a display of the mobile device from displaying a first user interface configured for presenting the first location to displaying a second user interface configured for presenting the second location, wherein:
   the first user interface includes a map of an interior of a building, and
   the second user interface includes a street map.

16. The non-transitory computer-readable medium of claim 13, wherein:
   the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

17. The non-transitory computer-readable medium of claim 16, wherein determining that the transition of state has occurred comprises:
   detecting that the mobile device has transitioned from the venue-specific state to the venue-independent state when the mobile device cannot detect signals from the one or more signal sources or when each measurement of signals from each of the one or more signal sources satisfies an exit threshold.

18. The non-transitory computer-readable medium of claim 17, wherein the entrance threshold is higher than the exit threshold.

19. A method comprising:
   determining, by a mobile device, a first location of the mobile device using a first subsystem of the mobile device;
   determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:
      determining that a probability that the transition has occurred has reached a threshold;
      triggering a measurement by a barometric pressure sensor of the mobile device upon the determining, the barometric pressure sensor configured to detect air pressure change indicative of a movement of the mobile device between floors of a building; and then
      confirming that the transition has occurred based on readings of the barometric pressure sensor; and
   determining, by the mobile device, a second location of the mobile device using the second subsystem.

20. The method of claim 19, wherein:
   one of the first subsystem or second subsystem is configured to determine a location of the mobile device using signals from a global satellite system, and
   another of the first subsystem or second subsystem is configured to determine a location of the mobile device using signals from one or more wireless access points.

21. The method of claim 19, comprising:
   upon determining that the transition of states has occurred, switching a display of the mobile device from displaying a first user interface configured for presenting the first location to displaying a second user interface configured for presenting the second location, wherein:
   the first user interface includes a map of an interior of a building, and
   the second user interface includes a street map.

22. The method of claim 19, wherein:
   the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

23. A system comprising:
a mobile device; and
a non-transitory computer-readable medium storing instructions operable to cause the mobile device to perform operations comprising:
   determining, by the mobile device, a first location of the mobile device using a first subsystem of the mobile device;
   determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:
      determining that a probability that the transition has occurred has reached a threshold;
      triggering a measurement by a barometric pressure sensor of the mobile device upon the determining, the barometric pressure sensor configured to detect air pressure change indicative of a movement of the mobile device between floors of a building; and then
      confirming that the transition has occurred based on readings of the barometric pressure sensor; and
   determining, by the mobile device, a second location of the mobile device using the second subsystem.

24. The system of claim 23, wherein:
one of the first subsystem or second subsystem is configured to determine a location of the mobile device using signals from a global satellite system, and
another of the first subsystem or second subsystem is configured to determine a location of the mobile device using signals from one or more wireless access points.

25. The system of claim 23, the operations comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

26. The system of claim 23, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

27. A non-transitory computer-readable medium storing instructions operable to cause a mobile device to perform operations comprising:
   determining a first location of the mobile device using a first subsystem of the mobile device;
   determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:
      determining that a probability that the transition has occurred has reached a threshold;
      triggering a measurement by a barometric pressure sensor of the mobile device upon the determining, the barometric pressure sensor configured to detect air pressure change indicative of a movement of the mobile device between floors of a building; and then
      confirming that the transition has occurred based on readings of the barometric pressure sensor; and
   determining, by the mobile device, a second location of the mobile device using the second subsystem.

28. The non-transitory computer-readable medium of claim 27, wherein:
one of the first subsystem or second subsystem is configured to determine a location of the mobile device using signals from a global satellite system, and
another of the first subsystem or second subsystem is configured to determine a location of the mobile device using signals from one or more wireless access points.

29. The non-transitory computer-readable medium of claim 27, the operations comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

30. The non-transitory computer-readable medium of claim 27, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

31. A method comprising:
determining, by a mobile device, a first location of the mobile device using a first subsystem of the mobile device;
determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:
   determining that a probability that the transition has occurred has reached a threshold;
   triggering a measurement using at least one of a hygrometer of the mobile device or a microphone of the mobile device upon the determining; and then
   confirming that the transition has occurred when:
      a difference between a first humidity reading of the hygrometer and a second humidity reading of the hygrometer satisfied an estimated threshold humidity difference between an indoor environment and an outdoor environment, or
a difference between a first noise level reading of the microphone and a second noise level reading of the microphone satisfied an estimated threshold noise level difference between an indoor environment and an outdoor environment; and
determining, by the mobile device, a second location of the mobile device using the second subsystem.

32. The method of claim 31, wherein:
one of the first subsystem or second subsystem is configured to determine a location of the mobile device using signals from a global satellite system, and
another of the first subsystem or second subsystem is configured to determine a location of the mobile device using signals from one or more wireless access points.

33. The method of claim 31, comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

34. The method of claim 31, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

35. A system comprising:
a mobile device; and
a non-transitory computer-readable medium storing instructions operable to cause the mobile device to perform operations comprising:
determining, by the mobile device, a first location of the mobile device using a first subsystem of the mobile device;
determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:
determining that a probability that the transition has occurred has reached a threshold;
triggering a measurement using at least one of a hygrometer of the mobile device or a microphone of the mobile device upon the determining; and then
confirming that the transition has occurred when:
a difference between a first humidity reading of the hygrometer and a second humidity reading of the hygrometer satisfied an estimated threshold humidity difference between an indoor environment and an outdoor environment, or
a difference between a first noise level reading of the microphone and a second noise level reading of the microphone satisfied an estimated threshold noise level difference between an indoor environment and an outdoor environment; and
determining, by the mobile device, a second location of the mobile device using the second subsystem.

36. The system of claim 35, wherein:
one of the first subsystem or second subsystem is configured to determine a location of the mobile device using signals from a global satellite system, and
another of the first subsystem or second subsystem is configured to determine a location of the mobile device using signals from one or more wireless access points.

37. The system of claim 35, the operations comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

38. The system of claim 35, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

39. A non-transitory computer-readable medium storing instructions operable to cause a mobile device to perform operations comprising:
determining, by the mobile device, a first location of the mobile device using a first subsystem of the mobile device;
determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:
determining that a probability that the transition has occurred has reached a threshold;
triggering a measurement using at least one of a hygrometer of the mobile device or a microphone of the mobile device upon the determining; and then
confirming that the transition has occurred when:
a difference between a first humidity reading of the hygrometer and a second humidity reading of the hygrometer satisfied an estimated threshold humidity difference between an indoor environment and an outdoor environment, or
a difference between a first noise level reading of the microphone and a second noise level reading of the microphone satisfied an estimated threshold noise level difference between an indoor environment and an outdoor environment; and
determining, by the mobile device, a second location of the mobile device using the second subsystem.

40. The non-transitory computer-readable medium of claim 39, wherein:
one of the first subsystem or second subsystem is configured to determine a location of the mobile device using signals from a global satellite system, and another of the first subsystem or second subsystem is configured to determine a location of the mobile device using signals from one or more wireless access points.

41. The non-transitory computer-readable medium of claim 39, the operations comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

42. The non-transitory computer-readable medium of claim 39, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

43. A method comprising:
determining, by a mobile device, a first location of the mobile device using a first subsystem of the mobile device;
determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:
determining that an estimated location of the mobile device is outside of a footprint of a venue, the footprint being an area determined based on a shape and a size of the venue and a location calculation error margin, wherein the location calculation error margin is an error margin of a location calculated by the mobile device using measurements of signals from one or more signal sources if the mobile device is located at the venue; and then
determining that the mobile device has transitioned from the venue-specific state to the venue-independent state; and
determining, by the mobile device, a second location of the mobile device using the second subsystem.

44. The method of claim 43, wherein:
one of the first subsystem or second subsystem is configured to determine a location of the mobile device using signals from a global satellite system, and
another of the first subsystem or second subsystem is configured to determine a location of the mobile device using signals from one or more wireless access points.

45. The method of claim 43, comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

46. The method of claim 43, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

47. A system comprising:
a mobile device; and
a non-transitory computer-readable medium storing instructions operable to cause the mobile device to perform operations comprising:
determining, by the mobile device, a first location of the mobile device using a first subsystem of the mobile device;
determining, by the mobile device, that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:
determining that an estimated location of the mobile device is outside of a footprint of a venue, the footprint being an area determined based on a shape and a size of the venue and a location calculation error margin, wherein the location calculation error margin is an error margin of a location calculated by the mobile device using measurements of signals from one or more signal sources if the mobile device is located at the venue; and then
determining that the mobile device has transitioned from the venue-specific state to the venue-independent state; and
determining, by the mobile device, a second location of the mobile device using the second subsystem.

48. The system of claim 47, wherein:
one of the first subsystem or second subsystem is configured to determine a location of the mobile device using signals from a global satellite system, and
another of the first subsystem or second subsystem is configured to determine a location of the mobile device using signals from one or more wireless access points.

49. The system of claim 47, the operations comprising:
upon determining that the transition of states has occurred, switching a display of the mobile device from displaying a first user interface configured for presenting the first location to displaying a second user interface configured for presenting the second location, wherein:
the first user interface includes a map of an interior of a building, and
the second user interface includes a street map.

50. The system of claim 47, wherein:
the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

51. A non-transitory computer-readable medium storing instructions operable to cause a mobile device to perform operations comprising:

determining a first location of the mobile device using a first subsystem of the mobile device;

determining that a transition of state has occurred, the transition of state indicating that, after the transition, a location estimation by a second subsystem of the mobile device is expected to be more accurate than a location estimation by the first subsystem, wherein the transition of state comprises transitioning from a venue-specific state to a venue-independent state or transitioning from a venue-independent state to a venue-specific state, and wherein determining that the transition of states has occurred comprises:

determining that an estimated location of the mobile device is outside of a footprint of a venue, the footprint being an area determined based on a shape and a size of the venue and a location calculation error margin, wherein the location calculation error margin is an error margin of a location calculated by the mobile device using measurements of signals from one or more signal sources if the mobile device is located at the venue; and then determining that the mobile device has transitioned from the venue-specific state to the venue-independent state; and determining a second location of the mobile device using the second subsystem.

52. The non-transitory computer-readable medium of claim 51, wherein:

one of the first subsystem or second subsystem is configured to determine a location of the mobile device using signals from a global satellite system, and another of the first subsystem or second subsystem is configured to determine a location of the mobile device using signals from one or more wireless access points.

53. The non-transitory computer-readable medium of claim 51, the operations comprising:

upon determining that the transition of states has occurred, switching a display of the mobile device from displaying a first user interface configured for presenting the first location to displaying a second user interface configured for presenting the second location, wherein:

the first user interface includes a map of an interior of a building, and the second user interface includes a street map.

54. The non-transitory computer-readable medium of claim 51, wherein:

the venue is associated with a location fingerprint database, the location fingerprint database comprising a plurality of location fingerprints of the venue, each location fingerprint being associated with a sample location in the venue and including expected measurements of signals from one or more signal sources by a mobile device located at the sample location.

\* \* \* \* \*